United States Patent [19]

Jeanneret

[11] Patent Number: 5,074,775

[45] Date of Patent: Dec. 24, 1991

[54] SPATULA CLEANING SYSTEM FOR MOLDS IN A FIXED SURFACE MOLDING APPARATUS

[75] Inventor: Rolando Jeanneret, Vina del Mar, Chile

[73] Assignee: Comerical E Industrial Ausonia Ltda., Vina Del Mar, Chile

[21] Appl. No.: 582,062

[22] Filed: Sep. 14, 1990

[30] Foreign Application Priority Data

Jul. 6, 1990 [AR] Argentina ............................ 317321

[51] Int. Cl.⁵ .............................................. B29C 29/00
[52] U.S. Cl. ..................................... 425/217; 264/39; 425/227; 425/228; 425/229
[58] Field of Search ............... 425/217, 225, 226, 227, 425/228, 229, 230; 264/39

[56] References Cited

U.S. PATENT DOCUMENTS 1,480,284  1/1924  Mignerey .......................... 425/226
4,011,036  3/1977  Bichet .............................. 425/217

Primary Examiner—Timothy Heitbrink
Attorney, Agent, or Firm—Cushman, Darby & Cushman

[57] ABSTRACT

A system for cleaning the bottom of a filled mold in a fixed surface molding process including providing a cleaning spatula in sliding contact with the surface of the mold while the mold is stationary and a device for raising the spatula above the mold when the spatula is returned to its intial position. A hopper is provided for receiving material removed by the spatula during the cleaning sweep.

13 Claims, 2 Drawing Sheets

SPATULA CLEANING SYSTEM FOR MOLDS IN A FIXED SURFACE MOLDING APPARATUS

BACKGROUND OF THE INVENTION

1. Field of the Invention

This invention relates to forming candy and chocolate bars and, more particularly, to a device for cleaning or screeding the surface of a filled mold which defines the bottom or base of the finished product.

2. Description of the Related Art

In chocolate molding plants, two cleaning systems for the bottoms of candy bars in molds are currently used.

One system is the so-called "roller system", wherein a cylinder disposed with its axis parallel to the surface of the mold is rotated in contact with the surface of the mold and removes the excess chocolate that covers the surface of the mold.

This system is efficient for cleaning the surface of the mold when the shell of the candy is formed. However, its operation is most deficient when it is necessary to screed the surface of the filled candy mold. This is because the roller, when rotating, removes excess chocolate by dragging, thus forming a void in the area which has already been cleaned. Accordingly, in some cases, the roller will remove more chocolate than is necessary and will expose the fill. The foregoing is caused by a critical condition which will depend upon, among other factors, the temperature and viscosity of the chocolate, which results in a major or minor adherence between the roller and the chocolate mass. As a result, the bottoms of the products manufactured using this system can have an irregular finish and, generally, will be concave.

The other system of bottom cleaning is known as "Fixed Spatula". In that system, a spatula having metal or rubber edges is disposed over the mold and perpendicular with respect to the travel direction of the mold. As such, the spatula is in contact with the surface of the bottom of the molded chocolate. When the mold advances under the spatula, all of the excess chocolate from the surface of the mold is retained by the spatula and removed from the mold.

Although the fixed spatula system is very simple, it has several disadvantages. For example, because the spatula is fixed, it is not possible to adjust the pressure it exerts on the mold. Furthermore, the cleaning speed is defined by the travel speed of the conveyed mold which is not always optimum for a perfect finishing of the product bottom. Even further, the excess chocolate can adhere to the spatula and will increase in volume. Thus, incorrect cleaning of the bottom of the molded chocolate will result after some hours of use. Accordingly, the spatula requires constant cleaning to operate correctly.

SUMMARY OF THE INVENTION

The invention provides a cleaning system for the bottoms of molded products which is simple and effective and overcomes the above-noted disadvantages of known systems. In the system of the invention, a spatula is provided which glides over the molds, cleaning the surface while the molds are stationary and maintains contact with the molds in only one direction. The spatula then rises to return to an initial position without touching the already even surface of the molded chocolate.

The system of the invention, which is described in greater detail below, thus exhibits several advantages. First, the cleaning spatula provides a perfectly smooth surface on the mold in contrast to the roller which produce concavities on the surfaces of the molded chocolate. Second, it is the spatula, not the molds, which moves allowing for better control of the process because the cleaning speed can be controlled at will, according to the density or fragility of the product. Third, the pressure of the spatula on the molds at the time of cleaning can be controlled, thus ensuring a perfect product finish. Fourth, the spatula is self-cleaned after each chocolate sweep thus preventing the accumulation of product and facilitating good finishing. Further, the excess chocolate will be automatically returned to supply tanks. Finally, the system of the invention, by means of hot air injectors, keeps the cleaning spatula clean and warm, thus improving the appearance of the base of all the molded chocolates.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENT

Figure 1:
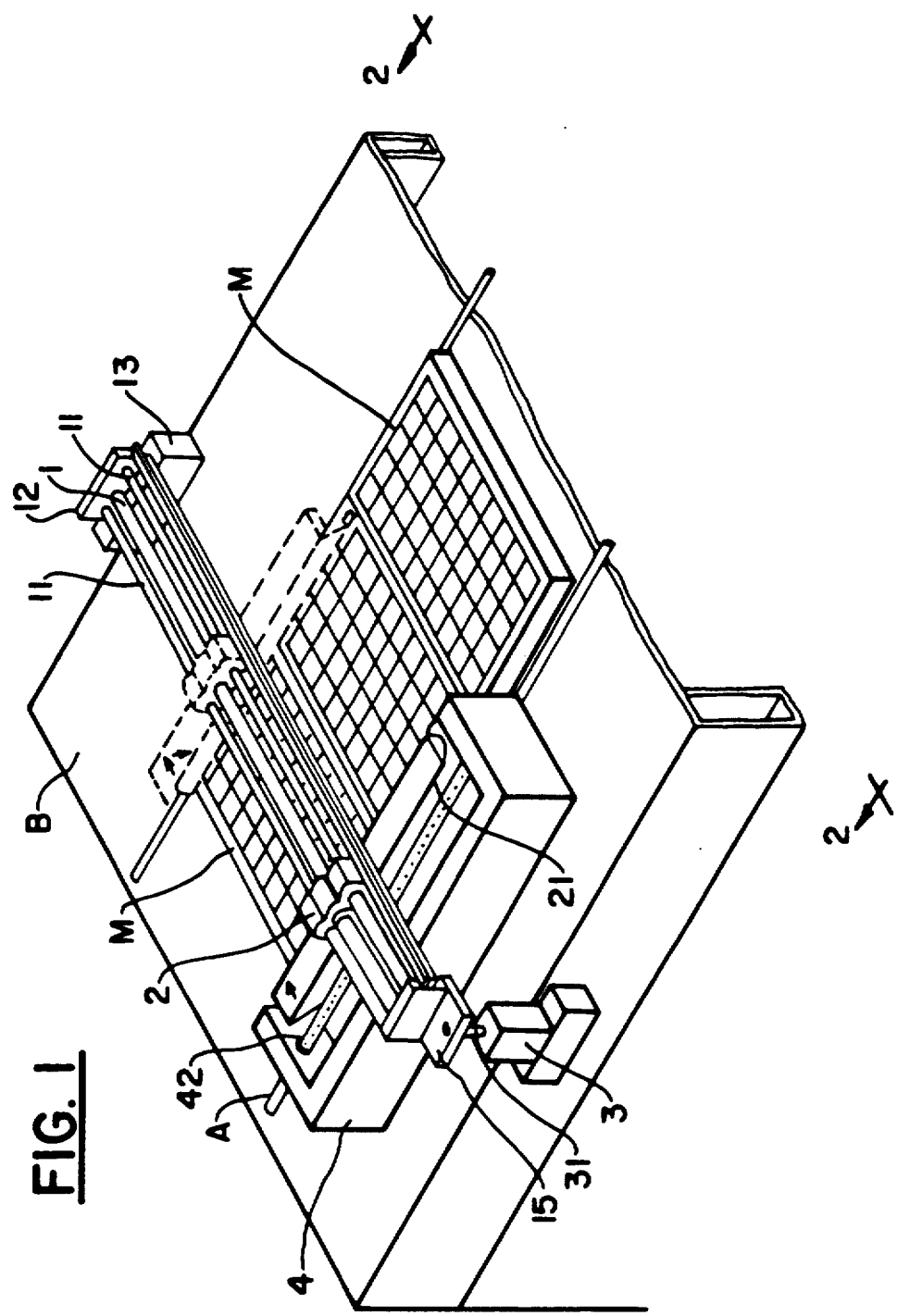
FIG. 1 is a schematic view, illustrating the mobile spatula-cleaning device provided in accordance with the present invention.
Figure 2:
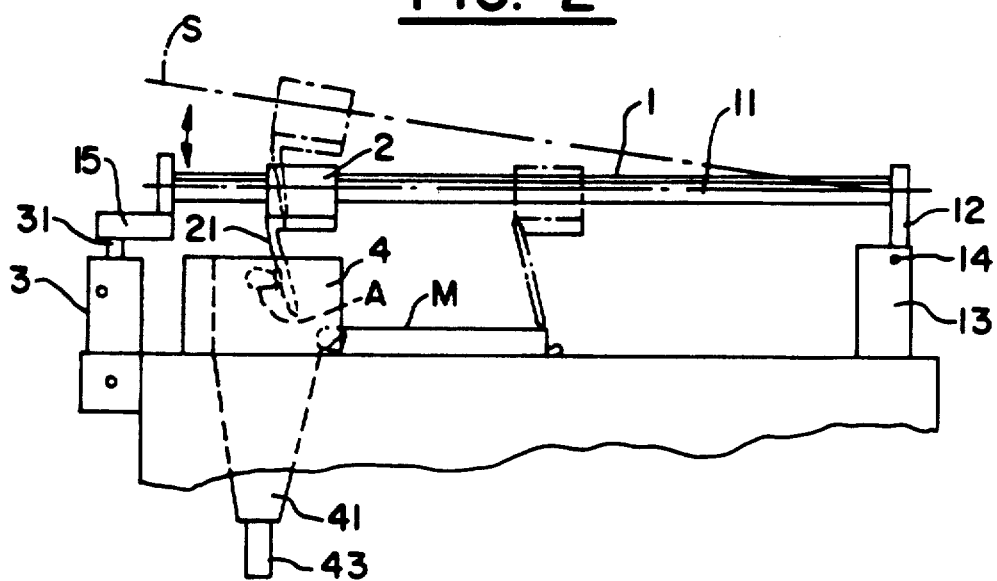
FIG. 2 is a view taken along line 2—2 of FIG. 1.

As shown in FIGS. 1 and 2, a rodless pneumatic cylinder 1 is mounted together with two parallel side guides 11 to a bearing 12 so as to be disposed substantially perpendicularly with respect to the travel direction of molds M. Bearing 12 is in turn pivotally mounted to base 13 by means of a pivot shaft 14 (FIG. 2) whose axis is substantially parallel to the travel direction of molds M.

A sliding spatula carrying piece 2 is mounted to and around rodless cylinder 1 and is coupled in any suitable manner to side guides 11 so as to be guided thereby to slide perpendicularly to the axis of cylinder 1.

A metal plate or spatula 21 is fixedly mounted to the spatula carrying piece 2 so as to move therewith. The initial or retracted position of carrying piece 2 and spatula 21 is shown in phantom lines on the right-hand side of FIG. 1.

An L shaped piece 15 is mounted to the free end of cylinder 1 as shown on the left-hand side of FIG. 1. L-shaped piece 15 is disposed directly above the rod 31 of a short stroke pneumatic cylinder which is disposed so as to extend and retract in a vertical direction as best shown in FIG. 2.

A box or open hood 4 is further provided in accordance with the present invention and is connected to a chocolate receiving hopper 41 and a chocolate return duct 43 (FIG. 2). The chocolate receiving hopper 41 is heated, for example, with hot water. At the end of its run, spatula 21 is retained in box 4, adjacent a drilled duct 42 which is closed at one end and receives hot air A from a source of hot air (not shown).

Rodless cylinder 1 can be, for example the type having a piston formed by a permanent magnet (not shown) so that displacement of the magnetic piston drags the spatula-carrying piece 2 displacing spatula 21 across molds M in a forward, cleaning direction or, backwards to return spatula 21 to its initial position at the beginning of the cleaning cycle.

The pneumatic rodless cylinder 1 and vertical cylinder 3 are connected, in a any known matter, to respective conventional directional electrovalves which are controlled by the signals of a programmable logic controller (PLC) of any known type. Likewise, the drilled hot air tube is preferably provided with a solenoid valve connected to the PLC to control the passage of hot air.

At the beginning of the cleaning cycle, the magnetic piston of cylinder 1 is retracted to its initial position with the spatula carrying piece 2 and spatula 21 spaced from the surface of the mold (FIG. 2), as discussed more fully below.

Rod 31 of the vertical pneumatic cylinder is retracted and accordingly the end piece 15 of cylinder 1 will then be at its bottom or lower position with the axis of cylinder 1 parallel to cover B of the molding machine. One or more molds M, full of chocolate, are stationary in front of spatula 21.

Figure 3:
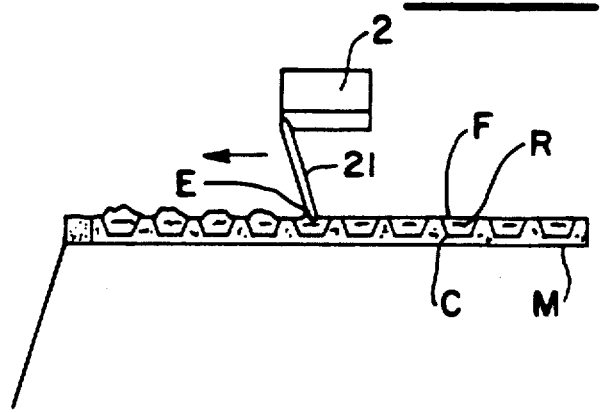
FIG. 3 is a sectional view showing the cleaning action of the spatula of the invention when screeding a mold.

In operation, the PLC (not shown) activates the control electrovalve (not shown) of the rodless pneumatic cylinder 1 and the magnetic piston will drag the spatula carrying piece 2 and spatula 21 towards hood 4. Because the bottom edge of spatula 21 touches the surface of mold M, the spatula pushes any excess chocolate E forwardly as shown in FIG. 3 leaving the shells C with bottoms F perfectly smooth and clean and with filling R completely covered within the mold cavities. At the end of the cleaning stroke, spatula 21 is disposed outside molds M and to the left thereof as shown in FIG. 2. At this time, spatula 21 is inside hood 4 and disposed adjacent to duct 42.

Compressed air, for example, is then fed to vertical cylinder 3, extending rod 31 to push piece 15 upwardly thereby causing cylinder 1 to pivot about pin 14. The cylinder is thus raised to its upper position S (FIG. 2) while hot air from duct 42 liquifies the chocolate which is adhered to spatula 21. Vertical cylinder 3 is preferably deactivated and activated at least once more to remove chocolate that sticks to spatula 21. The chocolate thus falls into hopper 41 where it is returned to the hot chocolate deposit (not shown).

At the end of the final activation cylinder 3, rod 31 remains extended, keeping the axis of cylinder 1 in position S. Cylinder 1 is then activated to return the magnetic piston to its initial position. The magnetic piston, in turn, returns the spatula 21 to its initial position without allowing the spatula to touch the already clean surface of mold M while the clean molds are pushed forwardly by means of a pusher (not shown).

As noted above, when spatula 21 reaches its initial position, rod 31 of cylinder 3 retracts to lower cylinder 1 until its axis is parallel to the surface of cover B. Full molds are delivered to the cleaning station and stopped to reinitiate the bottom cleaning cycle during the spatula cleaning and return process or once the spatula 21 has been returned to its initial position.

As is apparent from the foregoing, the system of the invention provides a simple structure which resolves the problems associated with conventional cleaning systems for the bottoms of molds.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A spatula cleaning apparatus for cleaning the bottom of molds in a fixed surface molding process comprising, in combination:

means defining a support surface;

means defining a path of travel of the molds to be cleaned along at least a portion of said support surface;

means defining a spatula having first and second longitudinal ends and a longitudinal axis;

means for mounting said spatula with respect to the molds to be cleaned so that said longitudinal axis of said spatula is disposed substantially parallel to said path of travel; and means for moving said spatula in a direction substantially transverse to said longitudinal axis thereof across at least one mold disposed on said path of travel from a first position disposed adjacent a first side edge of said mold to a second position disposed adjacent a second side edge of said mold and from said second position to said first position, said means for moving said spatula moving said spatula in a plane substantially parallel to a plane of a bottom surface of said mold when said spatula is moved from said first position to said second position and moving said spatula in a plane disposed at an angle of greater than zero degrees with respect to said plane of said bottom surface of said mold when said spatula is moved from said second position to said first position.

2. A spatula cleaning apparatus as in claim 1, further comprising means for removing material removed from said mold by said spatula and adhered to said spatula when said spatula is in said second position.

3. An apparatus as in claim 2, wherein said means for removing comprises means for heating material adhered to said spatula.

4. An apparatus as in claim 3, wherein said means for heating comprises at least one perforated air duct for conducting hot air to and along said spatula for melting material adhered to said spatula.

5. An apparatus as in claim 1, wherein said means for moving comprises at least one first cylinder means having first and second longitudinal ends and a longitudinal axis, said cylinder being disposed so that said longitudinal axis thereof is disposed substantially perpendicular to said longitudinal axis of said spatula and said path of travel, said cylinder means being pivotally mounted at a first end thereof to said support surface, said spatula means being coupled to said cylinder means so as to move therewith as said cylinder is extended and retracted.

6. An apparatus as in claim 5, wherein said means for moving further comprises means for moving said second, free end of said first cylinder means in a vertical direction so as to pivot said cylinder means about said pivotal mounting from a first vertical position to a second vertical position.

7. An apparatus as in claim 6, wherein said cylinder means is substantially parallel to said plane of said bottom surface of said mold when in said first vertical position and is disposed at an angle of greater than zero degrees with respect to said plane of said bottom surface of said mold in said second vertical position, whereby when said cylinder is in said first vertical position and is extended, said spatula means is urged across said surface of said mold and when said cylinder is pivoted from said first vertical position to said second vertical position and said cylinder is retracted, said spatula is moved to said first position thereof without contact said bottom surface of said mold.

8. An apparatus as in claim 7, wherein said means for moving said first cylinder means in said vertical direction comprises a second cylinder means having a rod operatively engaging said free end of said first cylinder means.

9. An apparatus as in claim 8, further comprising means for extending and retracting said second cylinder means so as to shake said first cylinder means and said spatula to remove mold material adhered to said spatula prior to retraction of said rod lift cylinder.

10. An apparatus as in claim 8, further comprising control means for controlling the movement of molds along said path of travel, the movement of said spatula transversely with respect to said molds and the lifting of said first cylinder means with respect to said plane of said mold.

11. An apparatus as in claim 5, further comprising a side guide disposed in parallel to and on each side of said first cylinder means, said spatula being operatively coupled to said side guides so that said side guides guide the spatula during a cleaning stroke.

12. An apparatus as in claim 1, further comprising a hood for housing said spatula in said second position thereof, said hood being operatively coupled to a mold material receiving hopper, and means for collecting and returning mold material from said hopper to a source of heated mold material.

13. An apparatus as in claim 12, further comprising means for heating said hood and said mold material collecting hopper coupled thereto.

* * * * *